United States Patent
Walker et al.

(10) Patent No.: US 6,663,739 B2
(45) Date of Patent: Dec. 16, 2003

(54) METHOD FOR FORMING A FLUID SEAL BETWEEN ROTATING AND STATIONARY MEMBERS

(75) Inventors: Michael S. Walker, Murrysville, PA (US); Phillip Dowson, Greensburg, PA (US)

(73) Assignee: Elliott Turbomachinery Co., Inc., Jeannette, PA (US)

( * ) Notice: Subject to any disclaimer, the term of this patent is extended or adjusted under 35 U.S.C. 154(b) by 171 days.

(21) Appl. No.: 09/954,566

(22) Filed: Sep. 17, 2001

(65) Prior Publication Data

US 2002/0017361 A1 Feb. 14, 2002

Related U.S. Application Data

(63) Continuation of application No. 09/312,509, filed on May 14, 1999, now abandoned.
(60) Provisional application No. 60/085,644, filed on May 15, 1998.

(51) Int. Cl.$^7$ .......................... B32B 31/04; B29C 45/02
(52) U.S. Cl. ................... 156/245; 156/154; 156/307.1
(58) Field of Search ................. 156/153, 154, 156/242, 245, 307.1; 264/102, 236, 237, 319, 327, 347; 415/173.4, 174.4

(56) References Cited

U.S. PATENT DOCUMENTS

| | | | |
|---|---|---|---|
| 2,962,809 A | 12/1960 | Short et al. ............... 29/445 |
| 3,547,455 A | 12/1970 | Daunt ......................... 277/96 |
| 3,575,427 A | 4/1971 | Lapac ......................... 277/96 |
| 3,799,128 A | 3/1974 | Small ........................ 123/41.49 |
| 3,918,925 A | 11/1975 | McComas .................. 29/182.3 |
| 4,349,313 A | 9/1982 | Munroe et al. ............. 415/174 |
| 4,460,185 A | 7/1984 | Grandey ..................... 277/53 |
| 4,649,005 A | * 3/1987 | Kobayashi et al. |
| 5,315,861 A | 5/1994 | Egan et al. ................... 73/37 |
| 5,948,856 A | 9/1999 | Juen et al. .................. 524/847 |

OTHER PUBLICATIONS

Agranoff, Joan, Modern Plastics Encyclopedia, Oct. 1983, vol. 60, No. 10A, pp. 92–93, 200–205.*
Berins, Michael L., Plastics Engineering Handbook of the Society of the Plastics Industry, Inc., Fifth Edition, Chapman and Hal New York, 1991, pp. 21, 258–259.*
Landrock, Arthur H., Adhesives Technology Handbook, Noyes Publications New Jersey, 1985, pp. 60, 61, 106–111, 176–17 198–201.*
Dowson, Phillip et al., "The Investigation of Suitability of Abradable Seal Materials for Application in Centrifugal Compressors and Steam Turbines," 20$^{th}$ Turbomachinery Symposium, Sep. 1991, College Station, Texas, pp. 77–90.

* cited by examiner

*Primary Examiner*—Michael W. Ball
*Assistant Examiner*—Gladys Corcoran
(74) *Attorney, Agent, or Firm*—Webb Ziesenheim Logsdon Orkin & Hanson, P.C.

(57) ABSTRACT

The present invention provides a method of forming an abradable seal between rotating and non-rotating components of a machine. A sheet of abradable material is formed and then cut to a desired shape to form an abradable sheet piece. An adhesive composition is applied to at least a portion of a substrate surface and the sheet piece is contacted with the adhesive composition to adhesively bond the sheet piece to the substrate to form the abradable seal. An abradable seal is also provided having an adhesive composition deposited over at least a portion of a substrate surface with an abradable sheet piece bonded to the substrate by the adhesive composition.

11 Claims, 1 Drawing Sheet

METHOD FOR FORMING A FLUID SEAL BETWEEN ROTATING AND STATIONARY MEMBERS

CROSS REFERENCE TO RELATED APPLICATION

This application is a continuation of U.S. application Ser. No. 09/312,509 filed May 14, 1999, now abandoned, which claims the benefit of U.S. Provisional Application No. 60/085,644 filed May 15, 1998.

BACKGROUND OF THE INVENTION

1. Field of the Invention

The invention relates generally to sealing devices for forming a fluid seal between rotating and stationary components of a machine and, more particularly, to a method of forming an abradable seal between the rotating and stationary components of turbomachinery equipment, e.g., a compressor.

2. Description of the Currently Available Technology

Energy savings and energy conservation are important considerations in the field of turbomachinery equipment. However, increased energy efficiency cannot be pursued without consideration of the costs involved in modifying the equipment to achieve such savings. If the cost of achieving an energy savings is greater than the benefit derived from the energy savings, the practical course of action would be to forego such a modification.

In the turbomachinery field, one way of accomplishing an increase in energy savings and an improvement in efficiency without a major increase in manufacturing costs is by reducing or eliminating gas leaks in the machinery, e.g., between the stationary and rotating components of the machinery. Excessive clearances between sealing devices located between the rotating and stationary components of turbomachinery equipment, such as compressors, have typically been a source of gas leaks, resulting in increased horsepower requirements and a loss of energy efficiency.

In order to reduce such gas leaks, sealing devices, such as metal or plastic sealing rings, labyrinth or knife edge seals, etc., are used. The most common seal design for centrifugal compressors is a labyrinth or knife edge seal. In this seal, a plurality of spaced apart labyrinth teeth on one component, e.g., the stationary component, are spaced from the other component by a small clearance. This simple seal works by contracting the gas as it flows through the close clearance points underneath the teeth and then expanding it between the teeth. This alternating contraction and expansion reduces the energy of the gas and lowers its flow rate. Leakage through the seal is proportional to the clearance. However, the clearance or gap between the sealing device and the rotating and/or stationary components must be controlled to a high tolerance. If the clearance is too small, the rotating component could rub the sealing device, possibly causing damage to both the rotating and stationary components. Also, sufficient clearance must be designed into the sealing device to allow for thermal expansion or surging of the machinery components during normal operation. Therefore, conventional metal or plastic sealing devices tend to be designed conservatively with respect to clearances, i.e., tend to have a relatively large sealing gap, e.g., 0.020"–0.030", to help reduce the chance of component rubbing and machinery damage.

One way of improving the efficiency and energy savings of rotating turbomachinery is through the use of abradable seals, i.e., seals made of material that is low in resistance to abrasion. Such abradable seals permit smaller clearances than conventional metal or plastic machinery seals and reduce the risk of damage to the rotating and stationary components should a rub occur. For example, silicone rubber has been used as an abradable seal material in the gas turbine industry. However, these known silicone rubber seals typically must be vacuum molded in place. For this conventional vacuum molding procedure, a specifically dimensioned mold is required for each different seal size. Since a typical compressor may have between seven to fifteen different size seals, this requires seven to fifteen different size molds to form the different size seals. The cost of acquiring and maintaining these different size molds greatly increases the overall manufacturing costs of the turbomachinery equipment. Further, the time required to mold each individual seal increases production time. Additionally, if the machine is redesigned with a new, different size seal, a new mold also must be acquired for that new seal size.

Therefore, it would be advantageous to provide a method of forming a seal, particularly an abradable seal, for turbomachinery equipment which reduces or eliminates the problems associated with conventional seals and seal forming methods.

SUMMARY OF THE INVENTION

In the present invention, abradable sealing material is adhesively bonded to a machinery piece rather than being vacuum molded in place, as was done previously. In particular, the present invention provides a method of forming an abradable seal between rotating and non-rotating components of a machine. A sheet of abradable material having uniform thickness is formed and then cut to a desired shape to form an abradable sheet piece. An adhesive composition is applied to at least a portion of a substrate surface of one of the components and the sheet piece is contacted with the adhesive composition to adhesively bond the sheet piece to the component substrate.

An abradable seal is also provided comprising an adhesive composition deposited over at least a portion of a substrate surface with an abradable sheet piece bonded to the substrate by the adhesive composition.

A complete understanding of the invention will be obtained from the following description when taken in connection with the accompanying drawing figure.

DESCRIPTION OF THE PREFERRED EMBODIMENT

Figure 1:
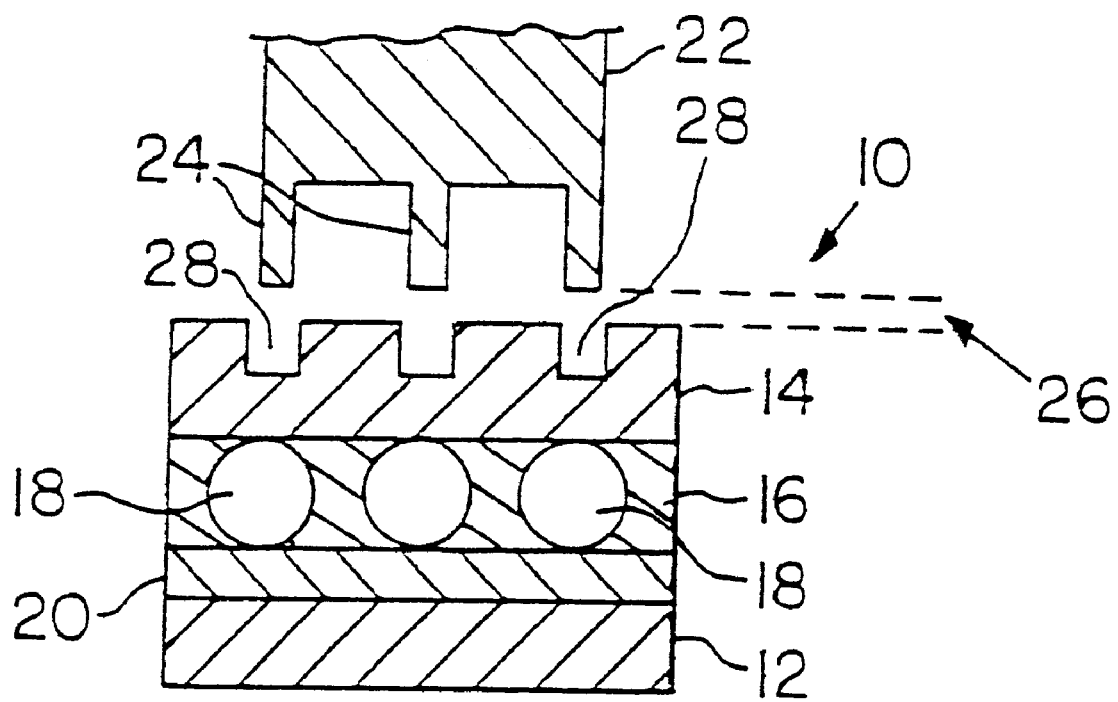
FIG. 1 is a side, sectional view (not to scale) of rotating and non-rotating components of a machine having an abradable seal incorporating features of the invention.

The general components comprising an abradable seal of the invention will be described first and then the method of forming the abradable seal will be discussed.

For purposes of discussion and not to be considered as limiting to the invention, the exemplary seal of the invention shown in FIG. 1 and discussed hereinbelow is configured as a labyrinth seal formed between a rotating component having labyrinth teeth and a non-rotating or stationary component to which abradable seal material is adhesively bonded in accordance with the invention. However, it is to be understood that the invention is not limited to this labyrinth seal configuration, e.g., the labyrinth teeth could be located on the stationary component and the abradable seal material mounted on the rotating component. Further, the invention is also not limited exclusively to labyrinth seals. Rather, the inventive concept can be used with any suitable type of conventional seal configuration. Also, as used herein, the term "applied over" means applied above but not necessarily adjacent to.

An abradable seal formed in accordance with the invention is generally designated 10 in FIG. 1. The seal 10 includes an abradable sheet piece 14, e.g., a piece of silicone rubber formed as described hereinbelow, adhesively bonded to a substrate 12 by an adhesive layer 16 having uniform thickness and having spacing elements 18, such as glass beads. As will be described hereinbelow, the size, e.g., diameter, of the spacing elements 18 defines the effective thickness or "bond line" of the adhesive layer 16, which is an important feature of the invention. A primer layer 20 may be located between the adhesive layer 16 and the substrate 12.

In the exemplary embodiment shown in FIG. 1, a rotating component 22 having labyrinth teeth 24 is spaced from the sheet piece 14 by a clearance or gap 26. In use, for example, when there is a machinery surge or when the machinery components expand due to thermal expansion, the labyrinth teeth 24 may contact and abrade the sheet piece 14 to form grooves or channels 28.

Rather than the molded in place abradable seals of the prior art, the present invention provides a method of adhesively bonding a piece of abradable material to one of the machinery components, e.g., the stationary component or the rotating component, of a piece of turbomachinery with sufficient adhesion to form an abradable seal. A plurality of separate seal molds are not required to form the seal 10 of the invention. This represents a great reduction in cost and time required to form such an abradable seal.

A representative example of a method of forming an abradable seal 10 in accordance with the invention will now be described.

REPRESENTATIVE EXAMPLE

A sheet of abradable material is first prepared. The abradable material preferably comprises siloxanes, more preferably comprises polysiloxane or silicone rubber material. For example, Visil V-622, commercially available from Rhone Poulenc Inc., of Amber, Pa., is suitable for forming a sheet of abradable material for the practice of the invention. Visil V-622 is a two-component system which requires weighing and proportioning the precursor components. After weighing the two components in accordance with the manufacturer's instructions, the components are mixed together with a conventional paddle-type mixer in a container. The mixture is then subjected to a vacuum to remove dissolved gases and entrained air produced by the mixing, e.g., a vacuum of about 28" of mercury for about one and a half hours.

After degassing, the mixture is molded into a sheet. The mold dimensions, e.g., the mold depth, will depend upon the desired thickness of the sheet and the sheet piece 14. For example, the mixture can be poured into a conventional 30"×30" square×0.125"±0.003" deep compression mold and spread substantially evenly in the mold. The mold dimensions should be tightly controlled, e.g., have a tolerance of about 0.002"–0.005", to form the sheet. The mold is closed and heated to a temperature of about 200–350° F., preferably about 300° F., for a period of about one half hour to two hours, preferably about one and a half hours, under a pressure of about 60–100 tons, preferably about 80 tons (177 psi). The heat is then turned off and the mold is allowed to cool under ambient conditions for a minimum of about one half hour while still under pressure. After the cooling step, the pressure is relieved and the mold opened to remove the resulting partially vulcanized sheet of abradable material. The sheet is transferred to a circulating hot air oven for post curing for about one half hour to two hours, preferably about 1.25 hours, at a temperature between about 300° F. and 500° F., preferably about 400° F. The sheet is then cooled to room temperature.

The sheet then may be cut into strips or pieces 14 of desired shape for attachment to one of the machinery components to form the abradable seal 10 of the invention. For example, for centrifugal compressors having labyrinth teeth located on the rotating component, the sheet piece should be cut to suitable dimensions to be bonded to the inner surface of the stationary component(s) to form the seal 10.

The substrate 12, i.e., the machinery component to which the abradable piece is to be attached, which in the exemplary example shown in FIG. 1 is the stationary component, is machined to the proper dimensions for incorporation into the seal allowing for the thickness of the primer layer 20, adhesive layer 16 and sheet piece 14. The substrate 12 is abrasively cleaned, such as by being blasted with 80–120 grit aluminum oxide and is then washed with acetone. The substrate 12 is primed with a primer material to form the primer layer 20 on the substrate 12. The primer layer 20 generally will be about 0.0001" thick. The primer material is preferably a dimethyl siloxane containing primer material with methyl silsesquioxane and solvents, such as Dow Corning 1204 primer commercially available from Dow Corning Corporation of Midland, Mich. The primer is allowed to cure for about one half hour to four hours.

An adhesive composition of the invention is applied to the primed substrate surface to form the adhesive layer 16. The adhesive composition of the invention includes an adhesive component, preferably comprising dimethyl siloxane, such as Dow Corning 3145 RTV, commercially available from Dow Corning Corporation of Midland, Mich., and a spacer material. The spacer material has spacing elements 18 to ensure a desired adhesive bond line. For example, with the system described above using Visil V-622, Dow Corning 1204 primer and Dow Corning 3145 RTV adhesive, a bond line of about 0.008"–0.015", preferably about 0.010"±0.001", is desired. If the bond line in this system is less than about 0.008" or greater than about 0.015", the bond strength of the adhesive composition decreases. Therefore, spacing elements 18 comprising glass beads of about 0.01041 in diameter, e.g., available from Potters Industries Inc. of Valley Forge, Pa., are added to the adhesive component. The amount of spacing elements 18 added to the adhesive component should be that amount sufficient to form a substantially uniform adhesive layer thickness without causing clumping or lumping. For the presently described system, a weight ratio of about 1:5 glass beads to adhesive component is preferred. The diameter of the glass beads defines the resulting bond line for the adhesive layer 16.

It should be noted that while the optimum bond line utilizing the above described components is about 0.010", this optimum bond line could change if different adhesives or primers are used. The optimum bond line for a particular adhesive system can be determined by measuring the bond strength of the adhesive at varying thicknesses, e.g., by forming adhesive compositions with different diameters of the glass beads added to the adhesive component and testing the bond strength of the resulting adhesive layers.

A surface of the abradable piece 14 to be bonded to the substrate 12 is roughed, e.g., with a conventional belt grinder, and then washed with acetone. The roughed and cleaned piece surface is placed onto the adhesive layer 16 and rolled to ensure a good contact. The bonded substrate 12 is allowed to cure for about 72 hours and then the bonded substrate 12 may be placed into position in the compressor. The tensile strength of a bonded substrate made in accordance with the above method was found to be about 245 psi, with an elongation (%) of 143, 100% modulus (psi) of 215, Die C Tear (lbs) of 39 and a shear strength of about 600–1450 psi.

The substrate 12 with the abradable sheet piece 14 adhesively bonded thereto may be mounted in conventional manner onto the turbomachinery equipment, such as by bolts. Since the sheet piece 14 is made of abradable material, the gap 26 between the labyrinth teeth 24 and the surface of the sheet piece 14 can be safely made very small, e.g., about 0"–0.008", thereby greatly increasing the efficiency of the machine. Should the teeth 24 contact the sheet piece 14, for example due to machinery surge or thermal expansion, the teeth 24 may cut channels 28 into the sheet piece 14. However, these channels do not significantly reduce the efficiency of the seal and, just as importantly, such contact does not damage the machine. Should the seal 10 need to be replaced, the substrate 12 can be removed and easily replaced with a similarly bonded substrate 12.

With the abradable seal forming method of the invention, an abradable seal 10 can be simply and cost effectively formed between the rotating and non-rotating components of a machine without the costly and time consuming conventional in situ vacuum molding processes.

It will be readily appreciated by those skilled in the art that modifications may be made to the invention without departing from the concepts disclosed in the foregoing description. For example, while the "substrate 12" described in the foregoing discussion was the stationary component, the labyrinth teeth 24 could be located on the stationary component and the seal 10 formed on the surface of the rotating component, in which case the "substrate 12" would be on the rotating component. Accordingly, the particular embodiments described in detail herein are illustrative only and are not limiting to the scope of the invention, which is to be given the full breadth of the appended claims and any and all equivalents thereof.

We claim:

1. A method of forming an abradable seal for use between rotating and non-rotating machinery components, wherein the abradable seal has a substrate with a surface upon which an abradable material may be applied and wherein the method comprises the steps of:
   a) providing a sheet of the abradable material having a uniform thickness by:
      1) forming a mixture of sheet precursor components;
      2) degassing the mixture; and
      3) pouring the mixture into a compression mold;
   b) cutting the sheet of the abradable material to form at least one abradable sheet piece of a desired shape;
   c) mixing an adhesive component with a spacer material to form an adhesive composition;
   d) applying the adhesive composition over at least a portion of the substrate surface; and
   e) contacting the abradable sheet piece with the adhesive composition to adhesively bond the abradable sheet piece to the substrate surface.

2. The method as claimed in claim 1, wherein the abradable material includes siloxane.

3. The method as claimed in claim 1, including applying a primer material to the substrate surface prior to the step of applying the adhesive composition.

4. The method as claimed in claim 1, further including partially vulcanizing the sheet of abradable material by:
   heating the compression mold to a temperature of about 200°–350°F. for about one half hour to two hours;
   applying a pressure of about 60–100 tons to the mold; and
   cooling the mold for a minimum of about one half hour.

5. The method as claimed in claim 4, including after the cooling step further curing the sheet of abradable material for about one half hour to two hours at a temperature of about 300°–500°F.

6. The method as claimed in claim 1, wherein the spacer material includes glass beads having a diameter of about 0.008"–0.015".

7. The method as claimed in claim 1, wherein the spacer material is about 20% by weight of the adhesive component.

8. The method as claimed in claim 1, including selecting the spacer material to form a selected bond thickness.

9. The method as claimed in claim 1, wherein the adhesive component includes dimethyl siloxane.

10. The method as claimed in claim 3, wherein the primer material includes dimethyl siloxane and methyl silsesquioxane.

11. A method of forming an abradable seal for use between rotating and non-rotating machinery components, wherein the abradable seal has a substrate with a surface upon which an abradable material may be applied and wherein the method comprises the steps of:
   a) providing a sheet of abradable material having a uniform thickness by:
      1) forming a mixture of sheet precursor components;
      2) degassing the mixture; and
      3) pouring the mixture into a compression mold;
   b) cutting the sheet of abradable material to form at least one abradable sheet piece of a desired shape;
   c) mixing an adhesive component with a spacer material to form an adhesive composition; and
   d) adhesively bonding the piece of abradable material to a substrate with the adhesive composition.

* * * * *